(12) United States Patent
Han et al.

(10) Patent No.: US 7,293,344 B2
(45) Date of Patent: Nov. 13, 2007

(54) PROCESS OF MAKING CD UNIFORMITY IN HIGH TRACK DENSITY RECORDING HEAD

(75) Inventors: Cherng-Chyi Han, San Jose, CA (US); Laurie Lauchlan, Saratoga, CA (US); Xiaomin Liu, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 458 days.

(21) Appl. No.: 10/886,888

(22) Filed: Jul. 8, 2004

(65) Prior Publication Data

US 2006/0007602 A1   Jan. 12, 2006

(51) Int. Cl.
*G11B 5/127* (2006.01)
*B44C 1/22* (2006.01)

(52) U.S. Cl. .............. 29/603.13; 29/603.14; 29/603.12; 360/119; 360/122; 360/125; 427/130; 204/192.1; 204/192.34

(58) Field of Classification Search ........... 29/603.01, 29/603.12, 603.14, 603.13; 360/119, 120, 360/122, 125; 216/22; 427/128, 130, 131, 427/132; 204/192.1, 192.11, 192.2, 192.15, 204/192.34
See application file for complete search history.

(56) References Cited

U.S. PATENT DOCUMENTS

| | | | |
|---|---|---|---|
| 5,559,654 A | 9/1996 | Das | 360/126 |
| 5,688,380 A * | 11/1997 | Koike et al. | 204/192.2 |
| 5,875,542 A * | 3/1999 | Tran et al. | 29/603.14 |
| 6,469,868 B2 | 10/2002 | Yamamoto et al. | 360/126 |
| 6,636,460 B2 | 10/2003 | Akiyama et al. | 369/13.14 |

FOREIGN PATENT DOCUMENTS

JP   62-149024   *   7/1987   .............. 427/128

* cited by examiner

*Primary Examiner*—A. Dexter Tugbang
(74) *Attorney, Agent, or Firm*—Saile Ackerman LLC; Stephen B. Ackerman

(57) ABSTRACT

A process for achieving tighter reader and writer track width control is disclosed. The write gap layer is used as the plating seed on which the upper pole is electro-formed. This allows the write gap layer to then be deposited through a precisely controllable process such as sputtering. Since less material needs to be removed during pole trimming, a thinner layer of photoresist may be used, resulting in improved dimensional control.

16 Claims, 2 Drawing Sheets

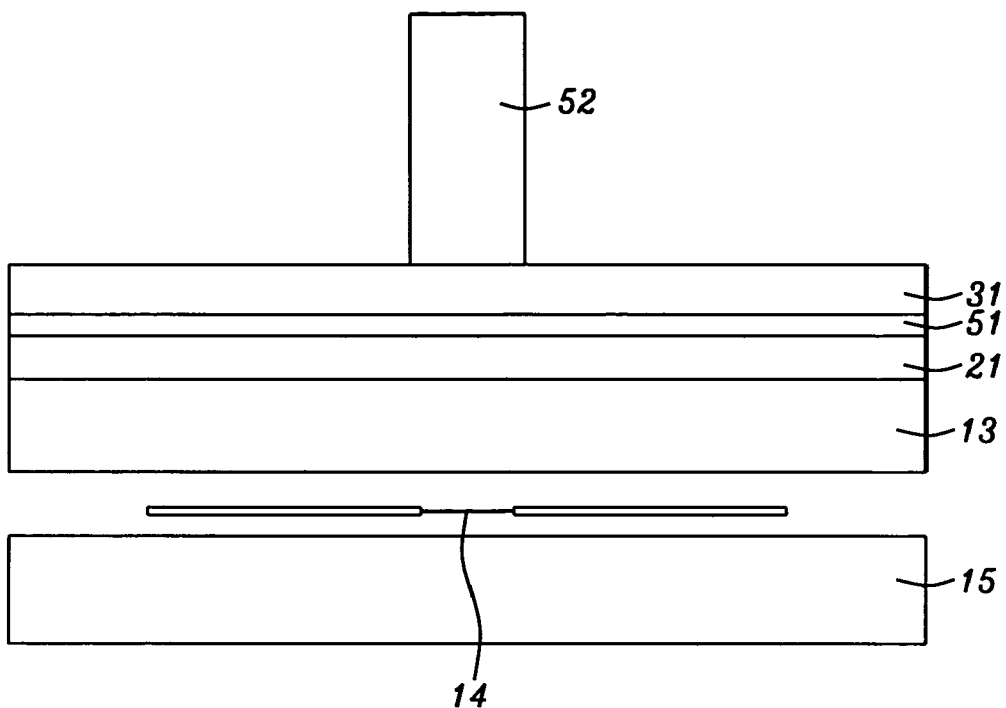
FIG. 1 – Prior Art
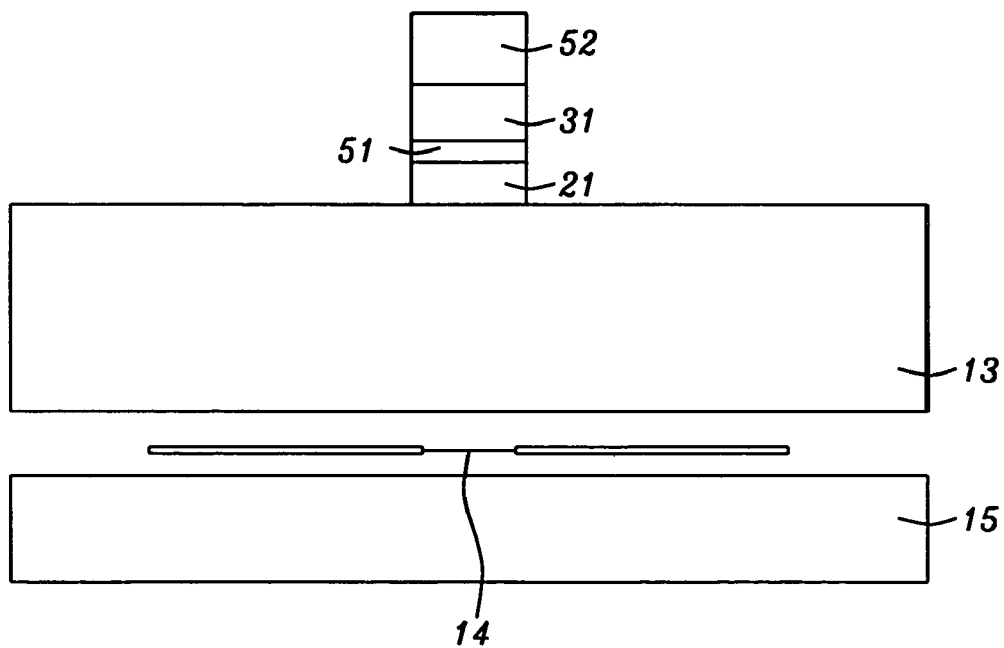
FIG. 2 – Prior Art

PROCESS OF MAKING CD UNIFORMITY IN HIGH TRACK DENSITY RECORDING HEAD

FIELD OF THE INVENTION

The invention relates to the general field of magnetic write heads with particular reference to an improved top pole piece.

BACKGROUND OF THE INVENTION

For high track density recording, tighter reader and writer track width control is the key ingredient for obtaining high yield. How to continue improving the writer track width by using a pole trim process together with a narrow pole width is a challenging task. The basic principle to having tighter pole width control is to have a thinner pole resist process so that photo CD (critical dimension) control can be further improved. Reducing the amount of material consumed during the pole trim process, without impacting performance, is the key factor associated with using a thinner pole resist.

The magnetic track width delta between reader and writer must be significantly reduced in high track density recording. Therefore, it becomes necessary to have better within-wafer reader and writer uniformity in order to meet performance requirements and provide a better yield. However, a pole trim process is required if one is to have a well defined track profile that facilitates the writing operation.

On the other hand, said pole trim process introduces new problems such as track width uniformity control which needs to be improved. To achieve this, one must either remove less material during trimming or an improved trimming method must be substituted. The present invention discloses a novel process that allows less material to be removed during trimming while continuing to maintain the same performance level as the standard pole trim process There have been several proposals to utilize a plated S2 (writer lower shield), a plated write gap, and a plated P2 (top pole) in a single photo process thereby minimizing the extent of pole trim consumption. However, with this scheme the throat height definition is rather poor so this type of design creates magnetic flux leakage between pole and shield. So poor overwrite is a consequence of this type of design.

Referring now to FIG. 1, the structure associated with our earlier process is illustrated. Seen there are upper and lower magnetic shields 13 and 15 respectively. Sandwiched between these shields is reader assembly 14. High magnetic moment seed layer 21 lies atop layer 13 with non-magnetic write gap layer 51 being on it. Covering layer 51 is P2 seed layer 31 on which P2 pole 52 is formed through electroplating inside a mold (not shown).

In FIG. 2 we illustrate the end product of the pole trimming process during which part of P2 is etched away together with the exposed portions of layers 21, 51, and 31. During this trim process, portions of the wafer surface away from the immediate vicinity of P2, such as test sites, will need to protected. Since the resist gets consumed at least as rapidly as the pole material, its thickness must exceed the amount of P2 removed during trimming. Resist thicknesses of 2-3 microns must therefore be used.

A routine search of the prior art was performed with the following references of interest being found:

U.S. Pat. No. 6,469,868 (Yanamoto et al) teaches that a seed layer may be made of a nonmagnetic and a conductive material. U.S. Pat. No. 6,636,460 (Akiyama et al) discloses a Ni or NiFe sputtering film as a plating seed layer. U.S. Pat. No. 5,559,654 (Das) teaches plating on a previously sputtered seed layer.

SUMMARY OF THE INVENTION

It has been an object of at least one embodiment of the present invention to reduce the amount of pole material consumed during pole trimming.

Another object of at least one embodiment of the present invention has been to facilitate use of thinner photoresist during formation of the top pole.

A further object of at least one embodiment of the present invention has been to achieve more precise control of the write gap thickness.

A still further object of at least one embodiment of the present invention has been to eliminate re-deposition of pole material during the pole trim process.

These objects have been achieved by using the write gap layer as the plating seed on which the upper pole is electroformed. This allows the write gap layer to be deposited through a precisely controllable process such as sputtering. Since less material needs to be removed during pole trimming, a thinner layer of photoresist may be used. This, in turn, makes possible a lower CD for the structure.

BRIEF DESCRIPTION OF THE DRAWINGS

FIG. 1 shows, for our earlier process, the series of layers on which the upper magnetic pole is laid down.

FIG. 2 shows the structure of FIG. 1 at the conclusion of pole trimming.

DESCRIPTION OF THE PREFERRED EMBODIMENTS

We will disclose the present invention through a description of the process used for its manufacture. This description will also serve to make clear the structure of the present invention.

Figure 3:
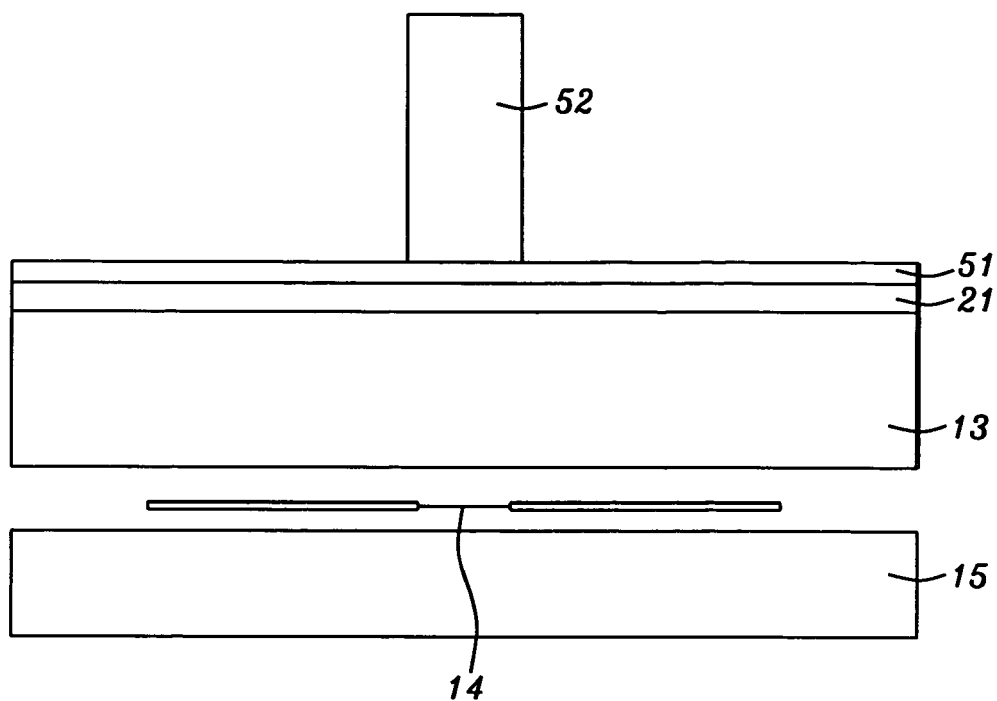
FIG. 3 illustrates how, in the present invention, a relatively small amount of material is laid down prior to pole trimming.

Referring now to FIG. 3, the process begins with the provision of lower magnetic shield layer 15 and forming magnetic read head 14 above it. This is followed by the deposition of upper magnetic shield layer 13, as shown, onto which is deposited high magnetic moment seed layer 21. The lower magnetic shield has a thickness between about 1 and 3 microns, the upper magnetic shield has a thickness between about 4 and 7 microns, and they are separated by between about 400 and 1,000 Angstroms.

High magnetic moment seed layer 21 is selected from the group consisting of CoFe and CoFeN and has a magnetic moment of at least 24 kilogauss. It is deposited to a thickness between about 1,000 and 4,000 Angstroms.

Now follows a key feature of the invention namely the deposition, through sputtering, of non-magnetic write gap layer 51 onto high magnetic moment seed layer 21. Once sputtering is chosen as the deposition means for the write gap layer it becomes possible to control its thickness very precisely (typically to within 50 Angstroms). The write gap layer material is any one of Ru, Rh, or NiCr and it is deposited to a thickness between about 700 and 1,200 Angstroms.

With layer 51 in place, pedestal shaped upper write pole 52 is formed, most commonly through electroplating inside a suitable photoresist mold (not shown). It is important to note that layer 51 acts as an effective seed for this electroplating process. The upper write pole is any one of CoFe or CoNiFe. Its initial height is between about 2.5 and 3.5 microns.

Figure 4:
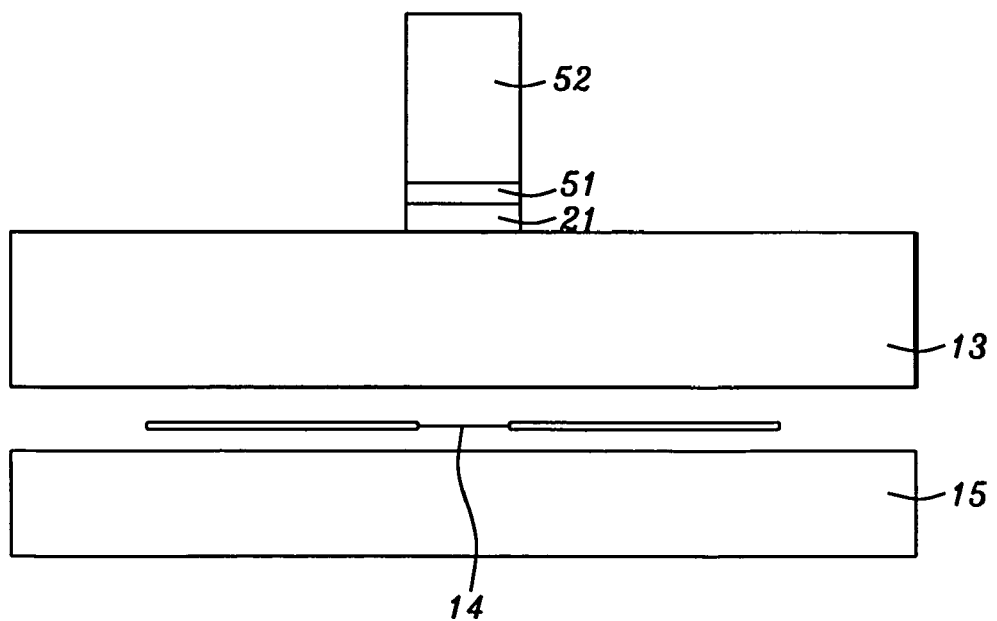
FIG. 4 shows the structure of FIG. 3 at the conclusion of pole trimming.

Referring now to FIG. 4, upper write pole 52 is used as a self aligning mask during an etching process wherein a portion of the write pole, as well as all areas of the structure that are not protected by photoresist (or by pole 52), are removed down to the level of layer 13. As a consequence, the width of write gap layer 51 becomes equal to that of upper write pole 52, said width now defining the write track width of the final writer (typically between about 0.1 and 0.2 microns). Additionally, the height of the upper write pole will have been reduced to between about 1 and 1.5 microns. For the etching process we have preferred using ion beam etching (IBE), low angle IBE to control trim depth followed by high angle IBE for etching to the final track width, but the invention is not limited to any particular etch process.

Because the process of the invention limits the material that needs to be removed during the etching process to layers 21 and 51, a lesser amount of pedestal 52 will be removed relative to earlier methods. Also, since a significant amount of photoresist is consumed during this etch process, the reduced etching time associated with the present invention allows a thinner layer of photoresist to be used. Typically, the photoresist layer will be between about 3.5 and 4 microns thick when etching starts and will be fully consumes when it is terminated. Use of this thinner-than-usual photoresist layer enables the associated photolithographic processes to be more precise so that the CD (critical dimension) of the structure is reduced to about 0.25 microns.

Another important advantage of the reduced pole trim etch time is that the amount of redeposition during etching is reduced so that better control of pedestal width variations is achieved. Said redeposition occurs because material sputtered from vertical surfaces during the high angle IBE may land on nearby horizontal surfaces and vice versa.

We conclude by noting that the present invention, as disclosed above, offers the following advantages:
1. Less P2 consumption required during pole trimming due to less material between P2 and the lower shield.
2. Thinner P2 resist can be used and tighter control, both within a single wafer and from wafer to wafer can be expected. A thinner resist allows greater photo-processing latitude (depth of focus, for example) which in turn leads to better P2 CD (critical dimension) control.
3. Heat dissipation by the writer is improved by replacing alumina with nonmagnetic metal materials, leading to less pole tip protrusion
4. Better writer track width control.
5. A simplified writer process.

What is claimed is:

1. A method to form a magnetic write head for high track density applications, comprising:
   providing a magnetic shield layer and depositing thereon a high magnetic moment seed layer;
   on said high magnetic moment seed layer, depositing, through sputtering, a non-magnetic write gap layer;
   then forming, on said non-magnetic write gap layer, an upper write pole having a first height;
   protecting portions of said write gap layer with a layer of photoresist having a thickness; and
   then, through an etching process wherein low angle ion beam etching (IBE) is used to control trim depth followed by high angle IBE to control final track width, reducing said upper write pole in height until all exposed portions of said write gap and seed layers are removed whereby said write gap layer is given a width that equals that of said upper pole, said width defining that of a write track.

2. The method described in claim 1 wherein said high magnetic moment seed layer is selected from the group consisting of CoFe and CoFeN.

3. The method described in claim 1 wherein said high magnetic moment seed layer is deposited to a thickness between about 1,000 and 4,000 Angstroms.

4. The method described in claim 1 wherein said high magnetic moment seed layer has a magnetic moment of at least 24 kilogauss.

5. The method described in claim 1 wherein said write gap layer is selected from the group consisting of Ru, Rh, and NiCr.

6. The method described in claim 1 wherein said write gap layer is deposited to a thickness between about 700 and 1,200 Angstroms, said thickness being controlled to within 50 Angstroms.

7. The method described in claim 1 wherein said upper write pole is selected from the group consisting of CoFe and CoFeN.

8. The method described in claim 1 wherein a first height of said upper pole is between about 2.5 and 3.5 microns.

9. The method described in claim 1 wherein a second height of said upper pole from said etching process is between about 1 and 1.5 microns.

10. The method described in claim 1 wherein said write track width is between about 0.1 and 0.2 microns.

11. The method described in claim 1 wherein said photoresist thickness is between about 3.5 and 4 microns.

12. A process to manufacture a magnetic read-write head, comprising:
   providing a lower magnetic shield layer and forming above said lower magnetic shield layer a magnetic read head;
   forming above said magnetic read head an upper magnetic shield layer;
   depositing on said upper magnetic shield layer a high magnetic moment seed layer;
   on said high magnetic moment seed layer, depositing, through sputtering, a non-magnetic write gap layer;
   then forming, on said non-magnetic write gap layer, an upper write pole having a first height;
   protecting portions of said write gap layer with a layer of photoresist; and
   then, through an etching process wherein low angle ion beam etching (IBE) is used to control trim depth followed by high angle IBE to control final track width, reducing said upper write pole in height until all exposed portions of said write gap and seed layers are removed whereby said write gap layer is given a width that equals that of said upper pole, said width defining that of a write track.

13. The process recited in claim 12 wherein said lower magnetic shield has a thickness between about 1 and 3 microns.

14. The process recited in claim 12 wherein said upper magnetic shield has a thickness between about 4 and 7 microns.

15. The process recited in claim 12 wherein said upper and lower magnetic shields are separated by between about 400 and 1,000 Angstroms.

16. The process recited in claim 12 wherein said write gap layer is deposited to a thickness between about 700 and 1,200 Angstroms, said thickness being controlled to within 50 Angstroms.

* * * * *